Sept. 27, 1932.  G. M. DEMING  1,880,076
WELDING APPARATUS
Filed Nov. 25, 1931
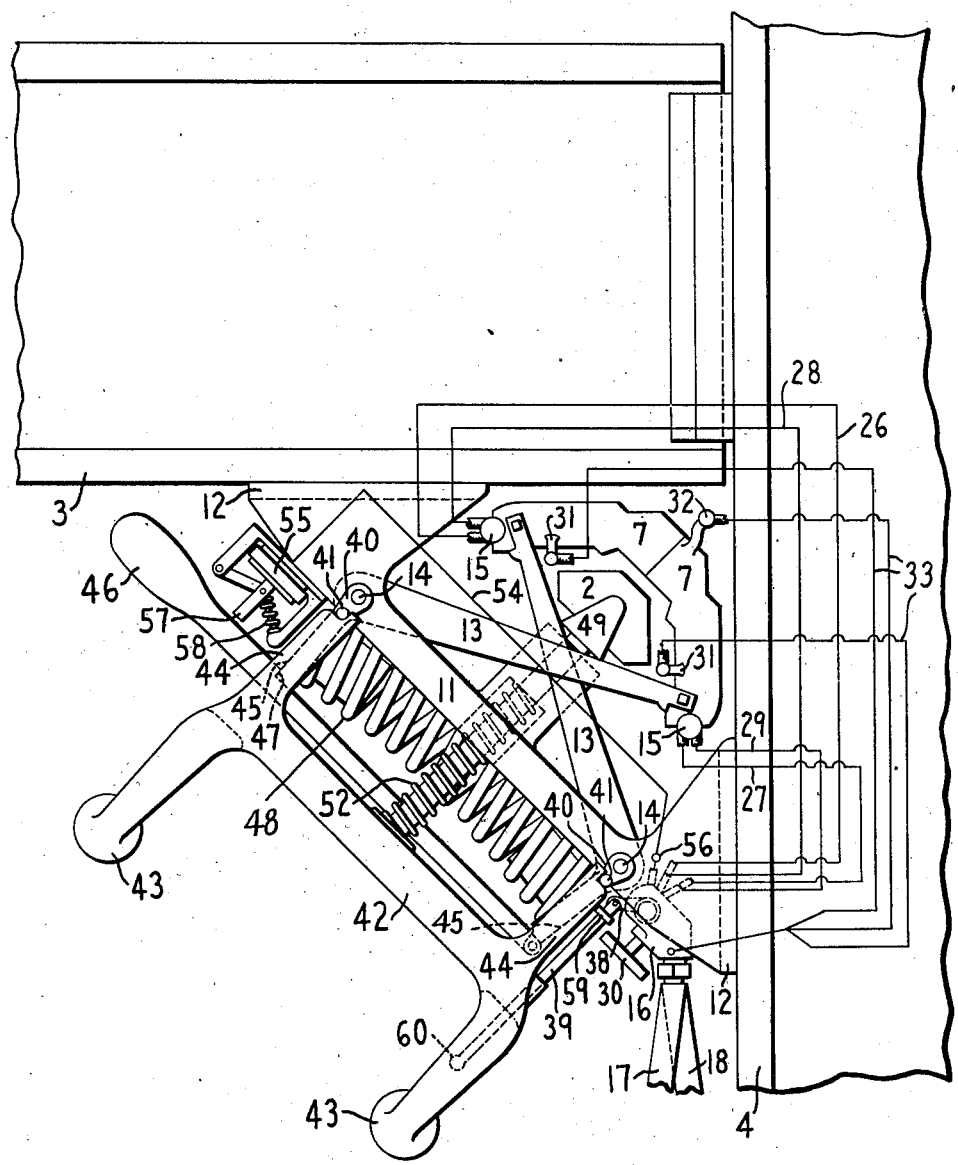
INVENTOR
George M. Deming
BY
ATTORNEY Patented Sept. 27, 1932

1,880,076

UNITED STATES PATENT OFFICE

GEORGE M. DEMING, OF EAST ORANGE, NEW JERSEY, ASSIGNOR TO AIR REDUCTION COMPANY, INCORPORATED, OF NEW YORK, N. Y., A CORPORATION OF NEW YORK

WELDING APPARATUS

Application filed November 25, 1931. Serial No. 577,284.

This invention relates to improvements in welding apparatus, and more especially, though not exclusively, to apparatus particularly adapted to carry out the welding method disclosed and claimed in my copending application Serial No. 452,899, filed May 16, 1930.

The object of the invention is to provide an advantageous apparatus, and numerous useful features of mechanism, for performing surface fusion welding by bringing together parts the surfaces of which have been melted.

Special objects to be attained with apparatus embodying the invention are: to connect two metal members by a metal joining piece,—more especially members and joining pieces of steel or ferrous metal,—to obtain an exceptionally strong connection, to avoid welding strains, and to accomplish the end quickly, economically, easily and with uniformly good results.

Further, the object is to provide means for temporarily holding or supporting a joining piece and an oxyacetylene torch or torches in definite spaced relation to each other and to two members to be connected by the joining piece, for bringing the opposed surfaces of the joining piece and of the members to a condition of melting or fusion which affects the surfaces only, though the metal below the surfaces may be, and preferably is, softened sufficiently to enable the parts to unite in a sound congelation weld notwithstanding surface irregularities, for protecting the surfaces from oxidation so that they are provided with clean films of molten metal, and for quickly applying the joining piece to the members to be connected as soon as the films have been formed.

A specific object of the invention is to provide means for successfully uniting, by a welding operation of this character, structural members which are disposed at an angle to each other, more especially building construction members such as columns and beams, the connection being made with the aid of a filler-block which is introduced into the corner between the members.

Other objects of the invention and other features of novelty of the apparatus, susceptible of application for surface fusion welding operations of various kinds will become apparent.

Structural steel members have been welded with hand torches, the operation being one of fusing together adjoining portions of the members with added metal melted from a rod or wire.

Apparatus such as will now be described enables welded structures to be made more expeditiously, more satisfactorily, and with saving of gases, in addition to the saving in labor and general expense resulting from speedier construction. The invention is not limited, however, to the particular form of the apparatus, or to the particular application of the invention, which are illustrated and which constitute specific aspects of the invention.

The drawing illustrates a form of execution of the apparatus in elevation, the gas supply lines being shown diagrammatically so as not to obscure the essential structure.

The welding machine comprises a primary frame 11 with legs 12 adapted to bear against members 3, 4, so that it can be held in position by hand pressure. This showing of a machine to be used for joining together a beam and column is illustrative. If desired, the machine can be fastened to one or both of the members to be joined in a manner permitting ready attachment and detachment.

Two crossed arms 13, or two pairs of such arms, are connected to the primary frame by shafts 14, and carry the torches. These arms may be considered as part of the general frame since they are part of the system of support and serve during the fusing period to hold the torches in definite position, as shown.

Each torch 7 is in the nature of a block provided with suitable distributing passages and jet orifices, which need not be illustrated in detail since the principles governing the internal design of multiple jet welding torch "tips" are familiar to those skilled in the art. The jets delivered by these torches are sufficiently numerous and properly distributed and arranged to heat and bring superficially to fusion the entire areas which are to be brought together. Each torch has a mixer 15, preferably associated directly with it, and each of these mixers is to be connected by the flexible gas conduits with outlet connections of a double cock 16 fixed to the primary frame.

The double cock has two inlet connections to receive hose lines 17 and 18 leading from sources of supply of oxygen and fuel gas, respectively, and the ports of the plug of this cock open and close communication between these two inlet connections and four outlet connections, two for oxygen and two for fuel gas. The oxygen outlet connections receive hose lengths 26 and 27, which conduct oxygen to the mixers of the respective torches, and, similarly, the fuel gas outlet connections receive hose lengths 28 and 29, which conduct this gas to the respective torches. Needle valves 30 in the gas inlet passages to the double cock serve for adjusting the flames to the desired size and neutrality.

The torches carry pilot burners 31 at their under sides, and one of them carries a pilot burner 32 at the outer side, to ignite the two sets of jets. These burners are connected, by hose lengths 33, with a by-pass through which fuel gas can flow when the double cock 16 is closed.

The double cock has an arm 38, which is connected with a rod 39 for opening and closing the cock.

Shafts 14, to which arms 13 are fixed, have short crank arms 40 provided with lugs 41. A handle-bar 42, terminating in rearwardly projecting handles 43, has forwardly projecting legs 44 adapted to bear against these lugs. This handle-bar forms a relatively movable part of the general frame as well as an operating member. During the operating period, pressure applied to the bar serves to hold the frame and thereby the torches and also the joining block 2 in the proper positions. If desired, a light spring 52 may be provided for pressing the handle-bar rearward.

The torch arms 13, or the shafts to which they are connected, have rearwardly projecting arms 45, one of these arms being pivoted to a latch bar 46, and the latter having a shoulder 47 to cooperate with the other of said arms. A spring 48 acting between the arms 45 exerts pressure which when released separates these arms and swings the torch arms so as to move the torches apart and out of the path of movement of the joining block into the corner formed by the structural members to be united. When this latch mechanism is set, the pressure of the spring is sufficient to keep the latch bar 47 in place, or means can be provided for urging the latch bar to its holding position.

The joining block 2 is held in a holder 49 on the forward end of a rod 50, which is slidable in a guide 51 on the primary frame 11 and has thrust connection at its rear end with the handle-bar 42. While the mechanism is latched this holder forms part of the frame which holds the torches and the joining block in predetermined spaced relations, with the torches between the block and the members which are to be united.

The opening of the double cock serves to feed oxygen through a bleeder port to a hose 54, through which a very small proportion of oxygen passes to a timing valve 55 on the primary frame. The bleeder port is so calculated, or the flow is so adjusted, as by a needle valve 56, that, when the requisite period for bringing the parts to surface fusion, or surface fusion plus sub-surface softening, has elapsed, the pressure beneath the diaphragm of the timing valve will be sufficient to move the pin 57 to a point at which a spring 58 connected with this pin acts to project the pin against a latch bar 46, to disengage the shoulder 47 of this bar from the arm 45 with which it coacts.

Thereupon, the spring 48 acts to swing the torches out of the way and to remove the lugs 41 from the legs 44 of the handle-bar. Pressure exerted on the handle-bar immediately advances the joining block 2 held in the holder 49 into the angle of the members to be united. The handle-bar in its forward movement also acts upon a collar 59 on the rod 39, to close the double cock 16.

The cock-operating rod 39 has a guide in the handle-bar adjacent one of the handles 43 and terminates in a finger-piece 60 for opening the cock.

The described apparatus permits two or more bodies to be united by means of a joining block and illustrates a form of the invention adapted to be used when bodies having angularly disposed surfaces are to be joined.

Use of the joining block makes it necessary only to fuse one or more surfaces of the block and corresponding surface areas of the members to be united. These surfaces can be quickly brought to the proper state for the formation of a sound weld. As contrasted with usual practice, it is not necessary, in producing the welded joint, to melt a large mass of metal with consequent heat losses due to radiation and conduction. And, it is not necessary to adhere to dimensional tolerances.

The space between the members to be joined, as shown, may vary within wide limits.

The operation is as follows:

The joining block 2 is placed in the holder 49. The latch 47 is set. The gases are turned on at the supply cylinders and the pilot burners 31, 32 are lighted. The operator grasps the handles 43 and holds the legs 12 of the primary frame against the structural members 3, 4. The torches and the filler-block are now precisely disposed for the heating and fusing operation and in readiness for the succeeding operation, which is the pushing of the joining block into the corner, the angular faces of which as well as the angular faces of the block will then have been melted. The operator opens the double cock 16, or other valve arrangement, by means of a finger-piece 60, and the mixture of oxygen and fuel gas emerging from the jet orifices at opposite sides of the torches 7 is ignited by the pilot. Follows a comparatively brief period of heating of the surfaces of the block and of the structural members by the heat liberated by the oxyacetylene flames burning in the confined spaces between the torches and the structural members on the one hand and the joining block on the other hand. When the proper condition of surface fusion has been attained, the timing valve 55 operates to unlock the mechanism whereupon the spring 48 swings the torches out of the path of the joining block, and the forward pressure which the operator is exerting on the handles 43 shoves the block 2 into the corner, where the surfaces of the block and of the structural members unite and congeal. At the same time the supply of gases to the welding flames is cut off. The reducing atmosphere supplied by the envelope gases are utilized to protect the fused surfaces from oxidation and chilling by the air, not only during the period while the surfaces are being brought to fusion but also during the momentary period required for removal of the torches and movement of the joining block to its final position.

The torches are of angular or other suitable shape, depending on the nature of the work. The torch orifices direct the jets simultaneously from opposite sides of the torches toward the joining block and toward the corresponding surface areas of the structural members.

The jets, directed obliquely to the surfaces, sweep away oxide and foreign material, leaving clean molten films or layers, which are effectively protected by the carbon monoxid and hydrogen of the flame envelopes produced. This reducing atmosphere acts to prevent oxidation and chilling by air currents.

The force transmitted to the block can be sufficient to overcome surface irregularities, and may be sufficient to improve the grain structure of the surface-to-surface weld.

One form of the apparatus, its operation and advantages having been described, it will be understood that other embodiments of the invention may be employed to unite bodies of other kinds and arranged otherwise than as shown, and that the details of the apparatus may be modified in numerous ways.

I claim:

1. Apparatus for uniting members by gas welding, comprising welding torches to be disposed between and adapted to bring simultaneously to fusion a surface or surfaces of a joining piece and corresponding surface areas of the members, a frame for holding the torches and joining piece in spaced relationship to the members, means for withdrawing the torches and means for projecting the joining piece against the adjacent surfaces of the members.

2. Apparatus for uniting members by gas welding comprising welding torches to be disposed between and adapted to bring simultaneously to fusion a surface or surfaces of a joining piece and corresponding surface areas of the members, a frame for holding the torches and joining piece in spaced relationship to the members, means for withdrawing the torches, means for projecting the joining piece against the adjacent surface areas of said members, and a timing device for controlling both of said operations.

3. Apparatus for uniting members by gas welding, comprising welding torches arranged between and adapted to bring simultaneously to fusion a surface or surfaces of a joining piece and corresponding surface areas of the members, a frame for holding the torches and joining piece in spaced relationship to the members, said frame having movable arms for the torches and a movable holder for the joining-block, and means for actuating said arms and said holder to withdraw the torches and project the joining piece against the members to be united.

4. Apparatus for uniting members by gas welding, comprising welding torches arranged between and adapted to bring simultaneously to fusion a surface or surfaces of a joining piece and corresponding, adjacent surface areas of said members, a frame for holding the torches and joining piece in spaced relationship to the members, said frame having movable arms for the torches and a movable holder for the joining piece, means for actuating said arms and said holder, and a timing device controlling said means.

5. Apparatus for uniting members by gas welding, comprising welding torches arranged between and adapted to bring simultaneously to fusion a surface or surfaces of a joining piece and corresponding surface areas of the members, a frame for holding the torches and block in spaced relationship to the members, means for withdrawing the torches, means for projecting the joining piece against the adjacent surfaces of the members to be united, and means for automatically cutting off the supply of gases to the welding flames.

6. Apparatus for uniting structural members by oxyacetylene welding, comprising torches adapted to bring simultaneously to surface fusion two angularly disposed surfaces of a joining block and corresponding surface areas of the members to be united, a frame for holding the torches and the joining block in definite spaced relationship to the structural members, means for withdrawing the torches from between the joining block and the structural members, and means for projecting the joining block into the included angle between the members.

7. Apparatus for uniting structural members by oxyacetylene welding, comprising torches adapted to bring simultaneously to surface fusion two angularly disposed surfaces of a joining block and corresponding surface areas of the members to be united, a frame for holding the torches and the joining block in definite spaced relationship to the structural members, means for withdrawing the torches from between the joining block and the structural members, means for projecting the joining block into the included angle between the members, and a timing device operated by welding gas to control said means.

8. Apparatus for uniting structural members by oxyacetylene welding, comprising torches adapted to bring simultaneously to surface fusion two angularly disposed surfaces of a joining block and corresponding surface areas of the members to be united, a frame for holding the torches and the joining block in definite spaced relationship to the structural members, said frame including mechanism for withdrawing the torches and for projecting the joining block into the included angle between the members, a latch for said mechanism, and a timing device to release said latch.

9. Welding apparatus, comprising a torch having jet orifices on opposite sides, a frame for holding said torch and a piece to be brought to surface fusion in definite spaced relation to another piece to be likewise brought to surface fusion, mechanism for withdrawing the torch and immediately bringing the pieces into contact, and a timing device controlling said mechanism.

10. Welding apparatus comprising a pair of torch blocks having jet orifices on opposite sides, a frame for holding the torches and a joining piece to be brought to surface fusion in definite spaced relation to two members to be likewise brought to surface fusion, and mechanism for moving the two torch blocks out of the way and for bringing the joining piece into contact with the members.

11. Welding apparatus comprising a pair of torch blocks having jet orifices on opposite sides, a frame for holding the torch and a piece to be brought to surface fusion in definite spaced relation to another piece to be likewise brought to surface fusion, and mechanism, including a pair of crossed, pivoted arms, for swinging the torch blocks out from between the pieces and for projecting one piece into contact with the other of said pieces.

GEORGE M. DEMING.